US012650104B2

(12) United States Patent
Singh et al.

(10) Patent No.: US 12,650,104 B2
(45) Date of Patent: Jun. 9, 2026

(54) MULTISTAGE STAGE SEPARATION VORTEX FLOW AIR FILTER

(71) Applicant: VOLVO TRUCK CORPORATION, Gothenburg (SE)

(72) Inventors: Ranjeet Singh, Jabalpur (IN); Goutam Mandal, Malda (IN); Alokekumar Das, Gujarat (IN); Aiswarya Nair, Kadakkal (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 356 days.

(21) Appl. No.: 18/406,495

(22) Filed: Jan. 8, 2024

(65) Prior Publication Data

US 2025/0223937 A1    Jul. 10, 2025

(51) Int. Cl.
B01D 45/16        (2006.01)
B01D 45/08        (2006.01)
(Continued)

(52) U.S. Cl.
CPC ......... F02M 35/0214 (2013.01); B01D 45/08 (2013.01); B01D 45/16 (2013.01);
(Continued)

(58) Field of Classification Search
CPC ........... F02M 35/0214; F02M 35/0223; F02M 35/0226; F02M 35/02433;
(Continued)

(56) References Cited

U.S. PATENT DOCUMENTS 603,285 A * 5/1898 Porbeck .................... B07B 7/06
2,952,330 A * 9/1960 Winslow ............ B01D 19/0052
55/459.1
(Continued)

FOREIGN PATENT DOCUMENTS

CN         111359315 A      7/2020
DE        10053649 A1      5/2002
(Continued)

OTHER PUBLICATIONS

Extended European Search Report, European Patent Application No. 24222329.5, mailed Apr. 1, 2025, 7 pages.

*Primary Examiner* — Frank M Lawrence, Jr.
(74) *Attorney, Agent, or Firm* — Sage Patent Group

(57)        ABSTRACT

A multiple stage separation vortex flow air filter includes an air filter housing (AFH) having a central axis; a cylindrical helical plate located within the AFH proximate an upper shell bottom of the AFH; an air inlet eccentrically connected to the AFH to cause air flowing through the air inlet to create a vortex around the cylindrical helical plate; an perforated conical element in which the air flows through, the perforated conical element within the cylindrical helical plate around the central axis; an oblong conical casing that forms a conical passage and located along the central axis and partially within the perforated conical element, wherein air enters the conical passage through a whirling ring; and an air filter element within the oblong conical casing, wherein air flows through the air filter element and enters into an engine through an outlet pipe.

20 Claims, 8 Drawing Sheets

(51) Int. Cl.

| | |
|---|---|
| *B01D 46/00* | (2022.01) |
| *B01D 50/20* | (2022.01) |
| *B04C 3/06* | (2006.01) |
| *F02M 35/02* | (2006.01) |
| *F02M 35/022* | (2006.01) |
| *F02M 35/024* | (2006.01) |
| *F02M 35/08* | (2006.01) |

(52) U.S. Cl.
CPC ..... *B01D 46/0005* (2013.01); *B01D 46/0027* (2013.01); *B01D 46/0087* (2013.01); *B01D 50/20* (2022.01); *F02M 35/0223* (2013.01); *F02M 35/0226* (2013.01); *F02M 35/02433* (2013.01); *F02M 35/02483* (2013.01); *F02M 35/082* (2013.01)

(58) Field of Classification Search
CPC ........... F02M 35/02483; F02M 35/082; F02M 35/0216; B01D 45/08; B01D 45/16; B01D 46/0005; B01D 46/0027; B01D 46/0087; B01D 50/20; B04C 3/06
USPC .... 95/267, 268, 269, 271; 55/313, 447, 456, 55/457, 459.1
See application file for complete search history.

(56) References Cited

U.S. PATENT DOCUMENTS

| | | | | |
|---|---|---|---|---|
| 3,616,617 | A * | 11/1971 | De Groote | B01D 45/14 55/482 |
| 3,853,518 | A | 12/1974 | Tu et al. | |
| 3,898,068 | A * | 8/1975 | McNeil | B04C 5/10 55/459.1 |
| 4,289,611 | A | 9/1981 | Brockmann | |
| 6,171,356 | B1 * | 1/2001 | Twerdun | B01D 45/12 55/459.1 |
| 7,065,826 | B1 * | 6/2006 | Arnold | B04C 5/103 55/424 |
| 2004/0103785 | A1 * | 6/2004 | North | B04C 11/00 95/271 |
| 2020/0355145 | A1 | 11/2020 | Ming et al. | |

FOREIGN PATENT DOCUMENTS

| | | |
|---|---|---|
| GB | 761710 A | 11/1956 |
| JP | 2015096200 A | 5/2015 |
| SE | 1851202 A1 | 5/2020 |
| WO | 2022123593 A1 | 6/2022 |

* cited by examiner

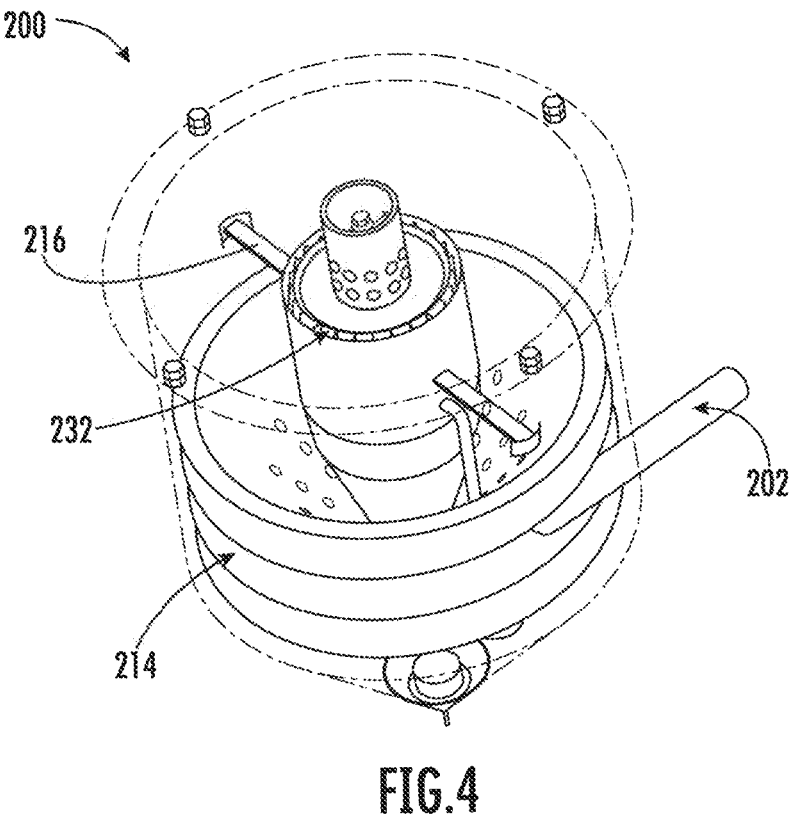
FIG.4
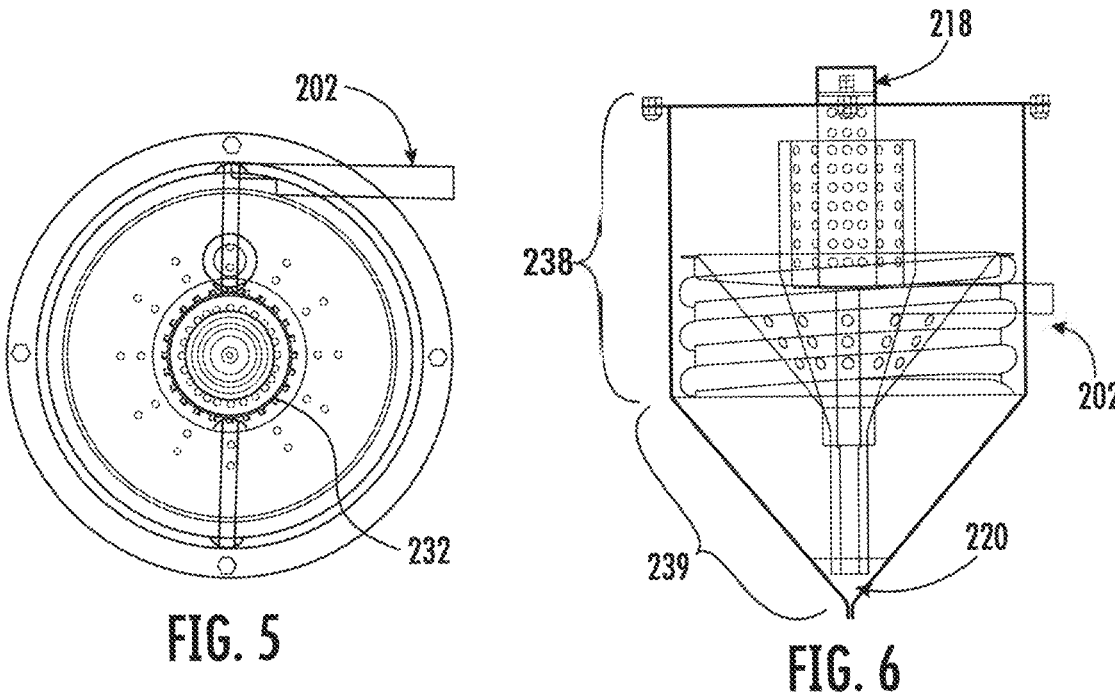
FIG. 5
FIG. 6

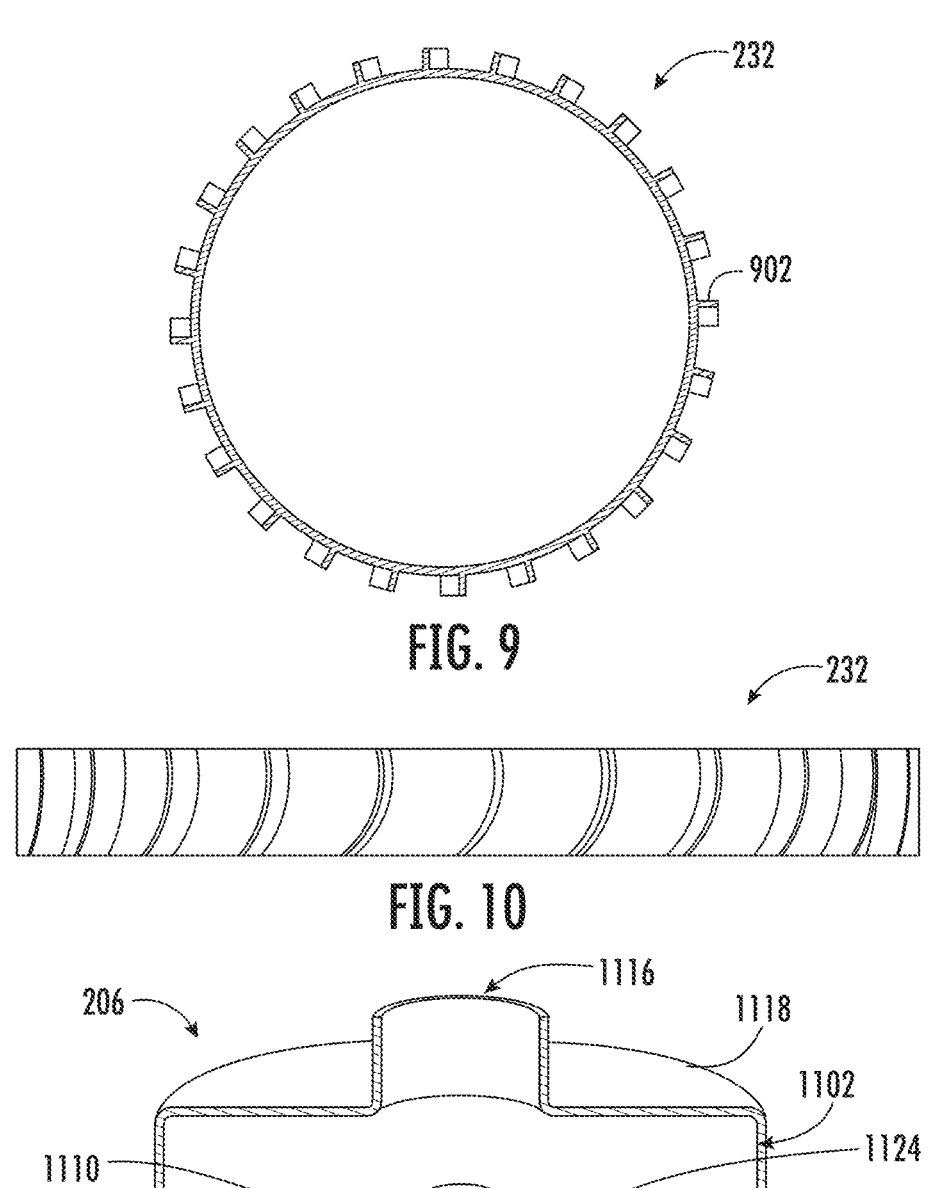
FIG. 9
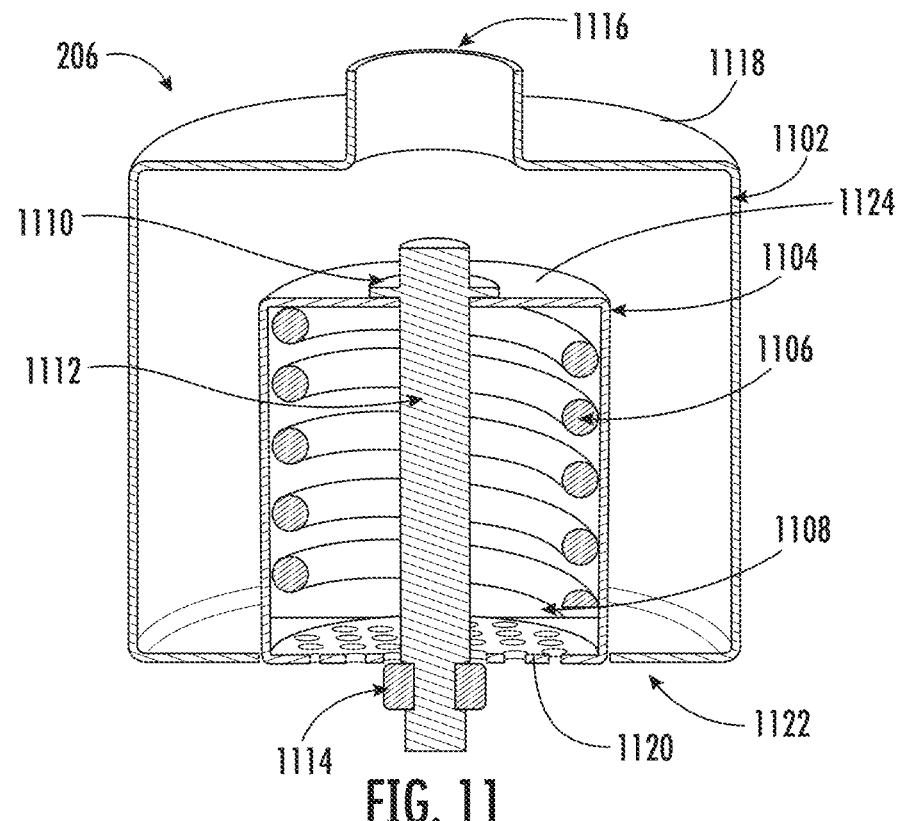
FIG. 10
FIG. 11

Figure 12:
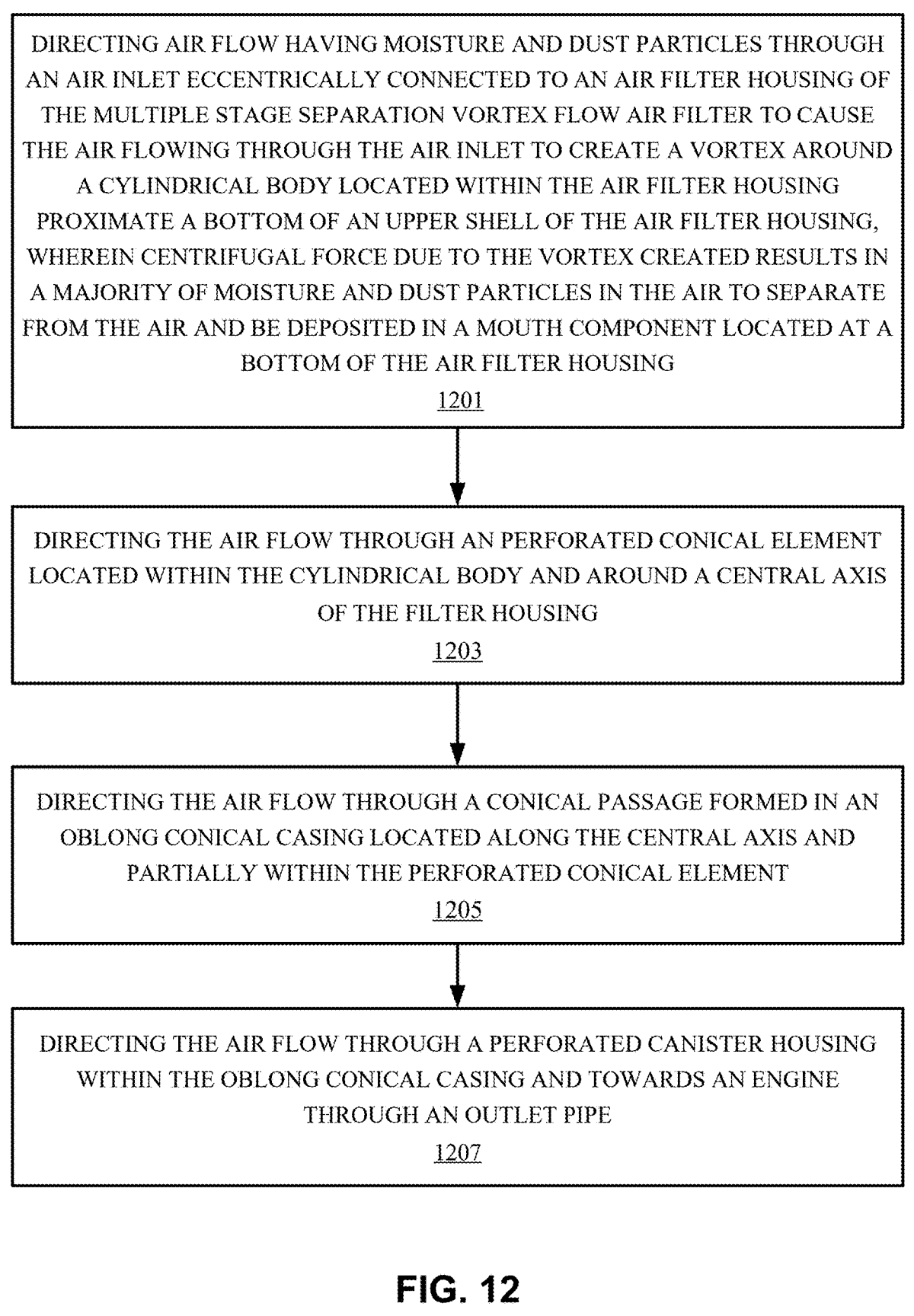

DIRECTING AIR FLOW HAVING MOISTURE AND DUST PARTICLES THROUGH AN AIR INLET ECCENTRICALLY CONNECTED TO AN AIR FILTER HOUSING OF THE MULTIPLE STAGE SEPARATION VORTEX FLOW AIR FILTER TO CAUSE THE AIR FLOWING THROUGH THE AIR INLET TO CREATE A VORTEX AROUND A CYLINDRICAL BODY LOCATED WITHIN THE AIR FILTER HOUSING PROXIMATE A BOTTOM OF AN UPPER SHELL OF THE AIR FILTER HOUSING, WHEREIN CENTRIFUGAL FORCE DUE TO THE VORTEX CREATED RESULTS IN A MAJORITY OF MOISTURE AND DUST PARTICLES IN THE AIR TO SEPARATE FROM THE AIR AND BE DEPOSITED IN A MOUTH COMPONENT LOCATED AT A BOTTOM OF THE AIR FILTER HOUSING

1201

DIRECTING THE AIR FLOW THROUGH AN PERFORATED CONICAL ELEMENT LOCATED WITHIN THE CYLINDRICAL BODY AND AROUND A CENTRAL AXIS OF THE FILTER HOUSING

1203

DIRECTING THE AIR FLOW THROUGH A CONICAL PASSAGE FORMED IN AN OBLONG CONICAL CASING LOCATED ALONG THE CENTRAL AXIS AND PARTIALLY WITHIN THE PERFORATED CONICAL ELEMENT

1205

DIRECTING THE AIR FLOW THROUGH A PERFORATED CANISTER HOUSING WITHIN THE OBLONG CONICAL CASING AND TOWARDS AN ENGINE THROUGH AN OUTLET PIPE

MULTISTAGE STAGE SEPARATION VORTEX FLOW AIR FILTER

TECHNICAL FIELD

The disclosure relates generally to air filters for air intake systems of automotive trucks. In particular aspects, the disclosure relates to a multistage stage separation vortex flow air filter. The disclosure can be applied in heavy-duty vehicles, such as trucks, buses, and construction equipment. Although the disclosure may be described with respect to a particular vehicle, the disclosure is not restricted to any particular vehicle.

BACKGROUND

Many heavy-duty vehicles are used in dusty environments. The air filters for the air intake systems of these vehicles are subject to these dusty environments and dust particles get into the air filters.

Conventional air filter systems have only one stage separation. Frequent blockage of air filtering canister by the dust particles, particularly in mining applications cause frequent maintenance, which incur high maintenance cost and reduction in the life of the canister.

SUMMARY

According to a first aspect of the disclosure, a multiple stage separation vortex flow air filter is provided. The multiple stage separation vortex flow air filter includes an air filter housing having a central axis. The multiple stage separation vortex flow air filter includes a cylindrical helical plate located within the air filter housing proximate a bottom of an upper shell of the air filter housing. The multiple stage separation vortex flow air filter includes an air inlet eccentrically connected to the air filter housing to cause air flowing through the air inlet to create a vortex around the cylindrical helical plate during operation. The multiple stage separation vortex flow air filter includes an perforated conical element in which the air flows through during operation; the perforated conical element within the cylindrical helical plate around the central axis. The multiple stage separation vortex flow air filter includes an oblong conical casing that forms a conical passage and located along the central axis and partially within the perforated conical element, wherein air enters the conical passage through a whirling ring during operation. The multiple stage separation vortex flow air filter includes an air filter element within the oblong conical casing, wherein air flows through the air filter element during operation and enters into an engine through an outlet pipe. The first aspect of the disclosure may seek to provide cleaner air to an engine combustion chamber. A technical benefit may include providing cleaner air to the engine, thereby increasing thermal efficiency of the engine.

In some examples, the oblong conical casing is mounted to the outer shell via a bracket. A technical benefit may include providing a simple mounting arrangement.

In some examples, the oblong conical casing is connected to a perforated plate that is connected to a central rod located along a central axis of the multiple stage separation vortex flow air filter. A technical benefit may include the perforated plate enabling air to flow through the perforated plate while enabling the oblong conical casing to be mounted within the multiple stage separation vortex flow air filter.

In some examples, centrifugal force due to the vortex created results in a majority of moisture and dust particles in the air to separate from the air and be deposited in a mouth located at a bottom of the air filter housing. A technical benefit may include providing cleaner air by the majority of moisture and dust particles in the air being separated from the air.

In some examples, the whirling ring creates a vortex as the air flows through the whirling ring, the vortex causing moisture and dust particles in the air to separate from the air and be deposited in a mouth located at a bottom of the air filter housing. A technical benefit may include providing cleaner air by the moisture and dust particles in the air being separated from the air.

In some examples, the cylindrical helical plate comprises a corrugated cylindrical helical plate. A technical benefit may include providing turbulent air as the air flows around the corrugated cylindrical helical plate.

In some examples, an air filter element is mounted in the perforated filter housing. A technical benefit may include providing cleaner air by the moisture and dust particles being trapped in the air filter element as air flows through the perforated filter housing.

In some examples, a pressure safety valve assembly is connected to the oblong conical casing via a bypass pipe line. A technical benefit may include enabling maintaining pressure drop when there is blockage in the cylindrical helical plate or in the perforated conical element/plate or in the whirling ring or in combination thereof.

In some examples, the pressure safety valve assembly includes a hollow shell having an air outlet at a first end of the hollow shell; a perforated shell mounted within the hollow shell and having perforated sides and a perforated bottom end at a second end of the hollow shell and a mounting hole at a top of the perforated shell, the mounting hole for receiving a threaded bolt having a plate that sits on the top that is held in place by a threaded bolt; and a spring within the perforated shell and sitting on a moveable plate within the perforated shell, wherein the moveable plate during operation is pushed up by air present in the bottom side of perforated shell through perforations present on the perforated bottom side of the perforated shell when there is an abnormal pressure drop due to blockage in the cylindrical helical plate or in the perforated conical element/plate or in the whirling ring or in combination thereof. A technical benefit may include maintaining pressure drop when there is blockage in the cylindrical helical plate or in the perforated conical element/plate or in the whirling ring or in combination thereof.

According to a second aspect of the disclosure, a method to filter air in a multiple stage separation vortex flow air filter includes flowing air having moisture and dust particles through an air inlet eccentrically connected to an air filter housing of the multiple stage separation vortex flow air filter to cause the air flowing through the air inlet to create a vortex around a cylindrical helical plate located within the air filter housing proximate a bottom of an upper shell of the air filter housing, wherein centrifugal force due to the vortex created results in a majority of moisture and dust particles in the air to separate from the air and be deposited in a mouth located at a bottom of the air filter housing. The method includes flowing the air through an perforated conical element located within the cylindrical helical plate and around a central axis of the filter housing. The method includes flowing the air through a conical passage formed in an oblong conical casing located along the central axis and partially within the perforated conical element. The method includes flowing air through an air filter element within the oblong conical casing and towards an engine through an outlet pipe. The second aspect of the disclosure may seek to provide cleaner air to an engine combustion chamber. A technical benefit may include providing cleaner air to the engine, thereby increasing thermal efficiency of the engine.

In some examples, air enters the conical passage through a whirling ring. A technical benefit may include providing cleaner air by the moisture and dust particles in the air being separated from the air.

In some examples, the whirling ring causes the air to form a vortex, wherein centrifugal force due to the vortex forces dust and moisture particles in the air to separate from the air and be deposited in the mouth. A technical benefit may include providing cleaner air by the moisture and dust particles in the air being separated from the air.

According to a third aspect of the disclosure, a vehicle is provided. The vehicle includes an engine and a multiple stage separation vortex flow air filter. The multiple stage separation vortex flow air filter includes an air filter housing having a central axis. The multiple stage separation vortex flow air filter includes a cylindrical helical plate located within the air filter housing proximate a bottom of an upper shell of the air filter housing. The multiple stage separation vortex flow air filter includes an air inlet eccentrically connected to the air filter housing to cause air flowing through the air inlet to create a vortex around the cylindrical helical plate during operation. The multiple stage separation vortex flow air filter includes a perforated conical element in which the air flows through during operation; the perforated conical element within the cylindrical helical plate around the central axis. The multiple stage separation vortex flow air filter includes an oblong conical casing that forms a conical passage and located along the central axis and partially within the perforated conical element, wherein air enters the conical passage through a whirling ring during operation. The multiple stage separation vortex flow air filter includes an air filter element within the oblong conical casing, wherein air flows through the air filter element during operation and enters into an engine through an outlet pipe. The first aspect of the disclosure may seek to provide cleaner air to an engine combustion chamber. A technical benefit may include providing cleaner air to the engine, thereby increasing thermal efficiency of the engine.

In some examples, the oblong conical casing is mounted to the outer shell via a bracket. A technical benefit may include providing a simple mounting arrangement.

In some examples, the oblong conical casing is connected to a perforated plate that is connected to a central rod located along a central axis of the multiple stage separation vortex flow air filter. A technical benefit may include the perforated plate enabling air to flow through the perforated plate while enabling the oblong conical casing to be mounted within the multiple stage separation vortex flow air filter.

In some examples, centrifugal force due to the vortex created results in a majority of moisture and dust particles in the air to separate from the air and be deposited in a mouth located at a bottom of the air filter housing. A technical benefit may include providing cleaner air by the majority of moisture and dust particles in the air being separated from the air.

In some examples, the whirling ring creates a vortex as the air flows through the whirling ring, the vortex causing moisture and dust particles in the air to separate from the air and be deposited in a mouth located at a bottom of the air filter housing. A technical benefit may include providing cleaner air by the moisture and dust particles in the air being separated from the air.

In some examples, the cylindrical helical plate comprises a corrugated cylindrical helical plate. A technical benefit may include providing turbulent air as the air flows around the corrugated cylindrical helical plate.

In some examples, an air filter element is mounted in the perforated filter housing. A technical benefit may include providing cleaner air by the moisture and dust particles being trapped in the air filter element as air flows through the perforated filter housing.

In some examples, a pressure safety valve assembly is connected to the oblong conical casing via a bypass pipe line. A technical benefit may include enabling maintaining pressure drop when there is blockage in the cylindrical helical plate or in the perforated conical element/plate or in the whirling ring or in combination thereof.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

FIG. 4 is an isometric view of the multiple stage separation vortex flow air filter according to one example.

FIG. 5 is an illustration of a wire frame top view of the multiple stage separation vortex flow air filter according to one example.

FIG. 6 is an illustration of a wire frame front view of the multiple stage separation vortex flow air filter according to one example.

FIG. 9 is a top view of a whirling ring of the multiple stage separation vortex flow air filter according to one example.

FIG. 10 is a front view of the whirling ring of the multiple stage separation vortex flow air filter according to one example.

FIG. 11 is a sectional view of a pressure safety valve assembly according to one example.

FIG. 12 is a flowchart of operating a multiple stage separation vortex flow air filter according to one example.

DETAILED DESCRIPTION

Aspects set forth below represent the necessary information to enable those skilled in the art to practice the disclosure.

A vehicle obtaining cleaner air for the engine than the environment it is operating in has an increased thermal efficiency of the engine than engines receiving air with substantial moisture and dust particles. According to various aspects of the disclosure, a multiple stage separation vortex flow air filter is provided that provides cleaner air than single stage separation filters currently being used.

Figure 1:
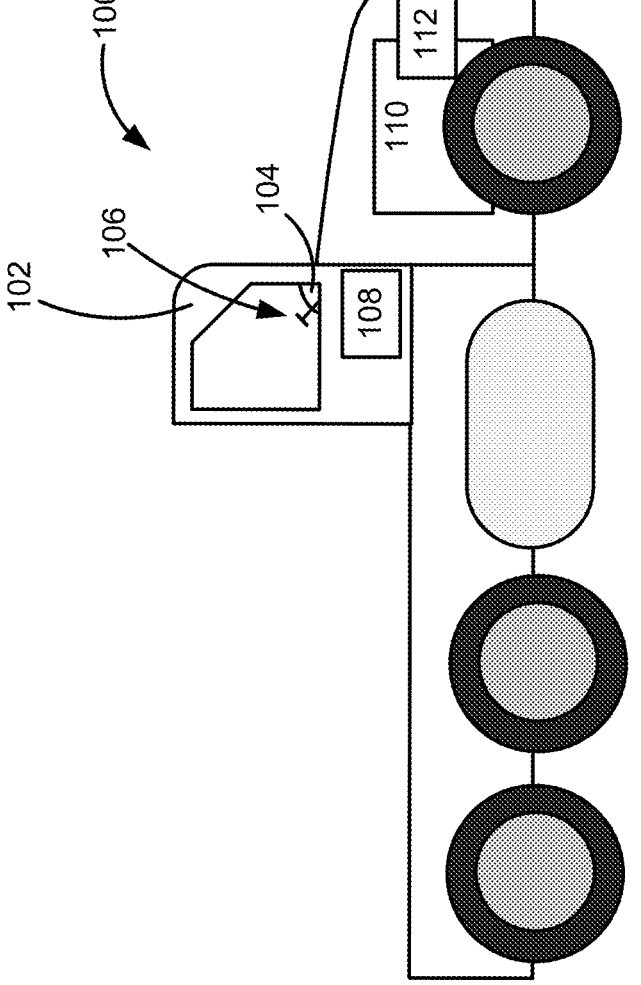
FIG. 1 is an exemplary diagram of a truck in which the multiple stage separation vortex flow air filter can be implemented within according to one example.

FIG. 1 is an exemplary vehicle in which the various aspects of the disclosure may be used according to one example. FIG. 1 illustrates a vehicle 100 (e.g., a truck) having a cab 102 used by a vehicle user. The vehicle user controls the vehicle using human-machine interfaces on the panels on the dashboard 104 and on the steering wheel 106. A vehicle control system 108 controls the vehicle 100 and engine 110. An air filter 112 provides filtered air to the engine 110.

The present disclosure describes a multiple stage vortex air filter that provides improved filtration systems for vehicles such as vehicle 100. Air enters into the multiple stage vortex air filter and is eccentrically guided by a cylindrical body causing a vortex such that heavy dust particles will be separated because of centrifugal force. After this there is a 180-degree directional change in air flow that causes a 2nd stage of separation.

After the 180-degree directional change, the air passes through the perforated conical element resulting in a 3rd stage of separation by removing moisture in the air. The air subsequently enters into a conical passage through a whirling ring, which causes vortex flow of air. Due to centrifugal force of air in this 4th stage, dust and moisture separation occur. After the 4th stage separation of dust and moisture, the air passes through a central coaxially placed perforated filter housing (where final filtration occurs, i.e., a 5th stage separation) and ultimately proceeds towards the engine (e.g., engine 110).

Figure 2:
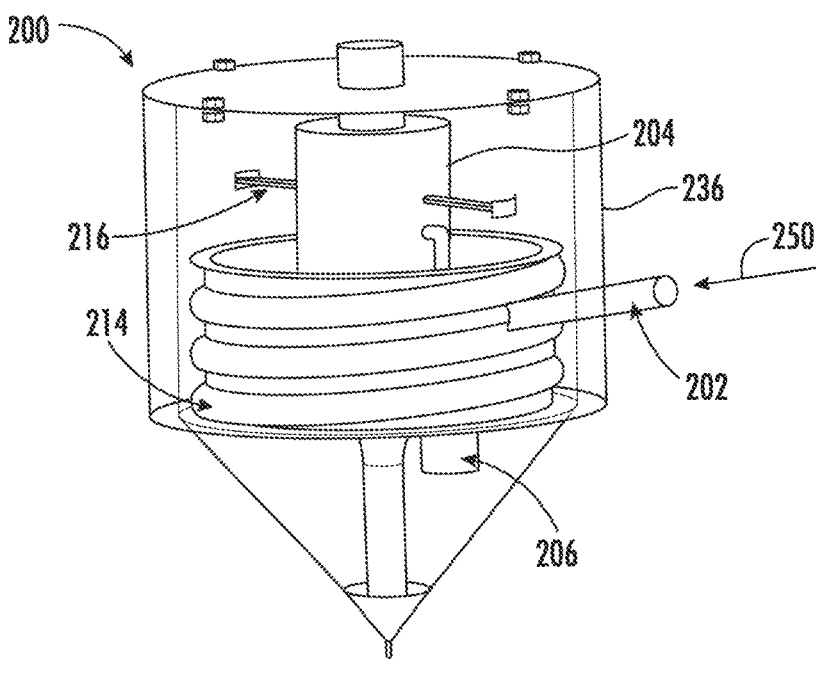
FIG. 2 is a schematic representation of the multiple stage separation vortex flow air filter according to one example.
Figure 3:
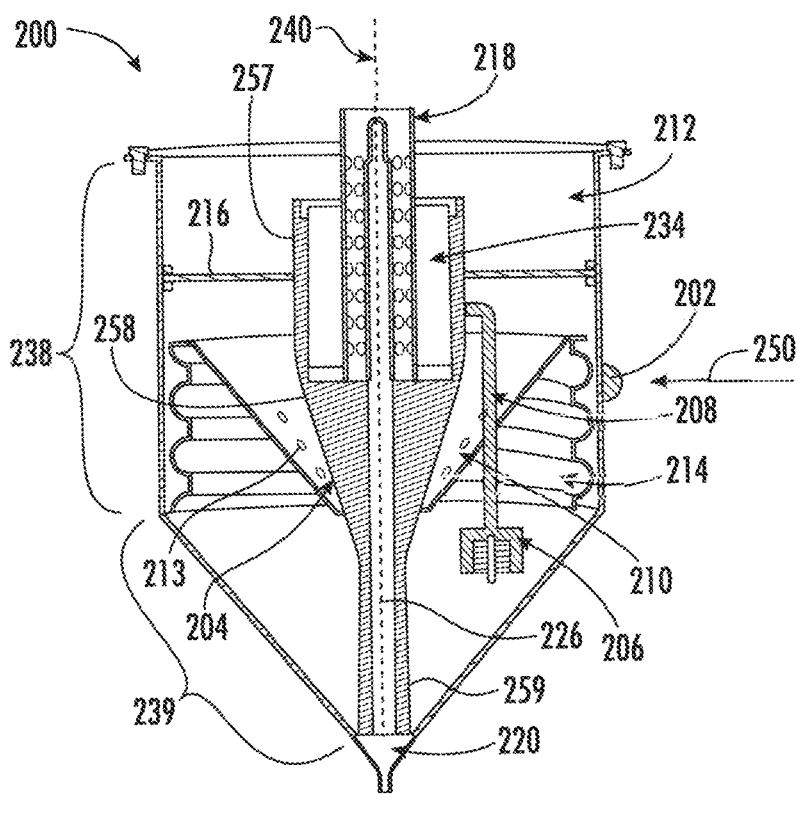
FIG. 3 is a sectional view of the multiple stage separation vortex flow air filter according to one example.

Reference is made to FIG. 2 through FIG. 6, which include schematics depicting various views of a multiple stage vortex flow air filter 200 in accordance with the principles of the present disclosure. Referring to FIG. 2, multiple stage vortex air filter 200 includes an inlet 202, a cylindrical body 214, a bracket 216, an oblong conical casing 204, and a pressure safety valve assembly 206. The structures and/or functions of these elements are described in greater detail below. Likewise, FIG. 3 depicts a sectional view of multiple stage separation vortex flow air filter 200. As shown in FIG. 3, multiple stage separation vortex flow air filter 200 comprises an air filter housing 236 that includes an upper shell 238 and a lower shell 239. Lower shell 239 is conical in shape and includes a mouth component 220 positioned at its bottom and a top opening that is adjacent to a bottom portion of upper shell 238. FIG. 3 further depicts oblong conical casing 204 as comprising an upper cylindrical portion 257, a middle conical portion 258, and a lower cylindrical portion 259, which has a smaller diameter than upper cylindrical portion 257.

As shown in FIG. 3, upper shell 238 forms an interior cavity that includes a plurality of components of air filter 200. For example, the interior cavity has sufficient space to accommodate bracket 216, outlet pipe 218, cylindrical body

214, perforated conical element 210, and oblong conical casing 204 (specifically, the upper cylindrical portion 257 and middle conical portion 258 of oblong conical casing 204). The terminal ends of bracket 216 are connected to the inner walls of air filter housing 236 and to upper cylindrical portion 257 of oblong conical casing 204. FIG. 3 similarly depicts multiple stage vortex flow air filter 200 including pressure safety valve assembly 206, a bypass pipe line 208, cylindrical body 214, mouth component 220, and inlet 202. FIG. 3 further illustrates a perforated filter housing 234 that is positioned in a cavity formed by the interior of the upper cylindrical portion 257 of oblong conical casing 204.

Figure 7:
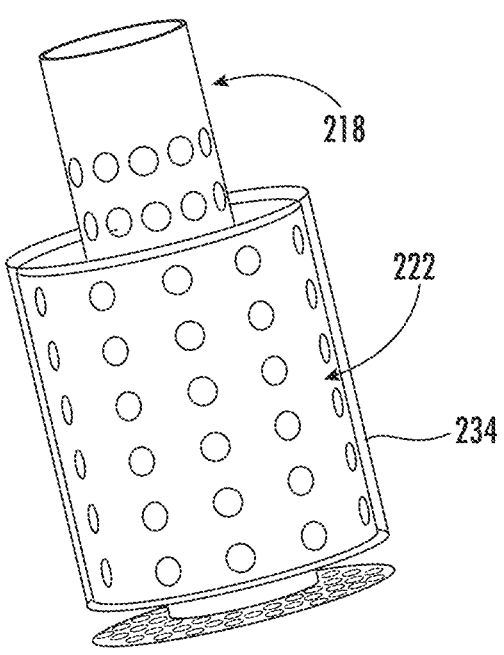
FIG. 7 is an illustration of the interior of an air filter element and perforated filter housing of the multiple stage separation vortex flow air filter according to one example.

FIG. 7 is an illustration of the interior of a perforated filter housing 234 of the multiple stage separation vortex flow air filter 200 according to one example. Notably, FIG. 7 depicts the outlet pipe 218 surrounded coaxially by an air filter element 222. In some embodiments, air filter element may be a disposable air filter. In some embodiments, perforated filter housing 234 may be constructed from a metallic, plastic, and/or composite material.

Referring back to FIG. 2, the inlet air (see arrow 250) from, e.g., a snorkel, enters into air filter 200 through inlet 202 (e.g., an air inlet pipe), which is eccentrically fitted with the air filter housing 236. Because of the eccentricity, inlet air will create the vortex around cylindrical body 214. As shown in FIG. 2, cylindrical body 214 includes an outer surface and an inner surface, which defines a cavity that accommodates oblong conical casing 204. Notably, cylindrical body 214 includes a helical channel or groove that traverses around its inner surface in a spiral manner (and includes respective contouring on its outer surface). Due to centrifugal force caused by the vortex, most of the moisture and dust particles are separated from the inlet air and collected in mouth component 220 during this is the 1st stage of filtration. In some embodiments, mouth component 220 is a conical and/or funnel shaped component that is positioned to receive the smaller terminal end of oblong conical casing 204. Specifically, the larger opening of mouth component 220 is configured to receive the lower cylindrical portion 259 of oblong conical casing 204 and the smaller/bottom opening of mouth component 220 provides an exit from air filter 200. In some embodiments, there is a small gap of separation between mouth component 220 and oblong conical casing 204 (e.g., see FIG. 6).

The second stage filtration occurs when air changes flow direction by 180 degrees (e.g., the air traverses around the helical groove on the outside of cylindrical body 214). In some embodiments, the 3rd stage separation subsequently occurs when air passes through the perforated conical element 210 where the moisture will be separated. Notably, perforated conical element 210 includes an upper opening that is larger in diameter as compared to its lower opening. Further, perforated conical element 210 includes a plurality of perforations 213 or holes that provide an opening to a cavity or space existing between cylindrical body 214 and perforated conical element 210. In some embodiments, perforated conical element 210 may be constructed from a metallic, plastic, and/or composite material. Perforated conical element 210 is positioned with the cavity of cylindrical body 214 and such that the upper opening is aligned with the upper edge of cylindrical body 214. After this, the air will enter into the oblong conical casing 204 through the whirling ring 232 (shown in FIG. 4). In some embodiments, oblong conical casing 204 is mounted to the inner surface of air filter housing 236 via bracket 216.

Figure 8:
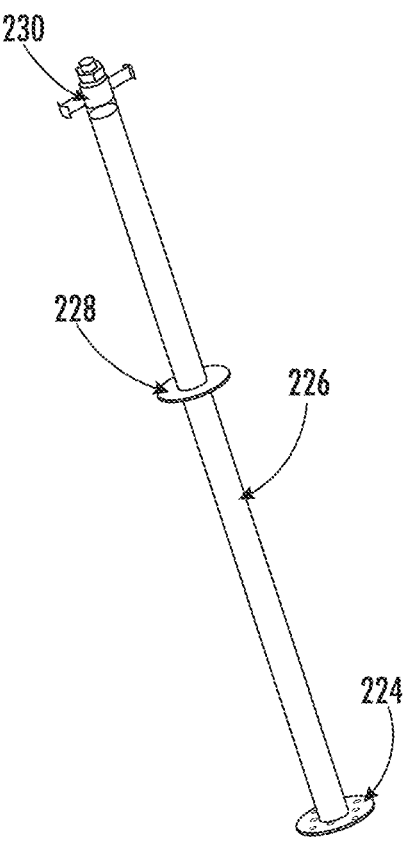
FIG. 8 is a three-dimensional (3D) view of a central rod of the multiple stage separation vortex flow air filter according to one example.

The design of the whirling ring 232, illustrated in FIG. 9 and FIG. 10 is such that it will create a vortex flow from air traversing through and/or around it. As shown in FIG. 9, whirling ring 232 is a circular shaped ring that includes a plurality of fin elements 902. Notably, each of the fin elements 902 is positioned around and protrude from the outer circumference of whirling ring 232. Notably, the arrangement and/or positioning of the fin elements 902 causes the vortex flow of air (i.e., as a result of air passing around the fin elements). Similarly, FIG. 10 depicts a front-view of whirling ring 232. Here, a 4th stage of separation will occur. Because of centrifugal force, moisture and dust particles will separate and deposit in the mouth component 220 (i.e., before exiting through its bottom exit hole). The filtered air goes through perforated filter housing 234, which is mounted on a central rod 226 as shown in FIG. 8. Notably, FIG. 8 depicts a 3D view of central rod 226 of the multiple stage separation vortex flow air filter according to one example. As shown in FIG. 8, central rod 226 includes outlet pipe bracket 230, central disk 228 (e.g., a circular solid plate on which outlet pipe 218 stands), and perforated disk 224. The filtered air ultimately enters the engine through outlet pipe 218. Notably, central rod 226 can function as a central axis that positions and/or outlet pipe bracket 230, central disk 228, and perforated disk 224 in a concentric alignment.

Referring now to FIGS. 3 and 11, pressure safety valve assembly 206 is connected to oblong conical casing 204 through bypass pipe line 208. FIG. 11 is a sectional view of a pressure safety valve assembly 206 according to one example. As depicted, pressure safety valve assembly 206 includes an valve assembly shell 1102 whose hollow interior forms a cavity that contains a perforated shell 1104. Valve assembly shell 1102 further includes an air outlet 1116 that provides an opening from a first end 1118 (i.e., top portion of valve assembly shell 1102). The interior of perforated shell 1104 contains a moveable plate 1108 and a pre-adjusted spring 1106, which encircles a bolt 1112 that positions a perforated bottom end 1120 of perforated shell 1103 to a second end 1122 of valve assembly shell 1102. As shown in FIG. 11, bolt 1112 is secured using a plate 1110 that is positioned on a top 1124 of perforated shell 1104 and a nut 1114 that is threaded/turned on bolt 1112 and is securely positioned underneath perforated bottom end 1120.

If there is large pressure drop due to a blockage in the cylindrical body 214 or in the perforated conical element 210 or in the whirling ring 232 or in combination thereof (e.g., see FIGS. 2-4), then the pre-adjusted spring 1106 will be compressed because a moveable plate 1108 will be pushed by air present in the bottom side of outer shell (e.g., outer shell 212 in FIG. 3) through perforations present on the bottom side (i.e., through perforated bottom end 1120) of the perforated shell 1104. Once the moveable plate 1108 is pushed up, air will enter into the interior of valve assembly shell 1102 through the perforations present at the bottom of shell 1104 (i.e., perforated bottom end 1120). This air enters into oblong conical casing 204 directly through bypass pipe line 208 instead of going through the main air path (e.g., through perforated conical element 210 and whirling ring 232) to maintain the pressure drop. The amount of air flow depends on the amount of blockage in the original air flow path (i.e., through cylindrical body 214, perforated conical element 210, and whirling ring 232). By adjusting the position of nut 1114 on bolt 1112, pre-compression of spring 1106 may be controlled. Plate 1110 is a structure responsible for holding perforated shell 1104 in place when the pre-adjusted spring is compressed.

FIG. 12 illustrates a method of filter air in a multiple stage separation vortex flow air filter 200. Turning to FIG. 12, in block 1201, the multiple stage separation vortex flow air filter 200 directs air flow having moisture and dust particles through an air inlet 202 eccentrically connected to an air filter housing 236 of the multiple stage separation vortex flow air filter 200 to cause the air flowing through the air inlet 202 to create a vortex around a cylindrical body 214 located within the air filter housing 236 proximate a bottom of an upper shell 238 of the air filter housing 236, wherein centrifugal force due to the vortex created results in a majority of moisture and dust particles in the air to separate from the air and be deposited in a mouth component 220 located at a bottom of the air filter housing 236.

In block 1203, the multiple stage separation vortex flow air filter 200 directs the air flow through an perforated conical element 210 located within the cylindrical body 214 and around a central axis 240 of the filter housing 236.

In block 1205, the multiple stage separation vortex flow air filter 200 directs the air flow through a conical passage formed in an oblong conical casing 204 located along the central axis 240 and partially within the perforated conical element 210.

In block 1207, the multiple stage separation vortex flow air filter 200 directs the air flow through an air filter element 222 within the oblong conical casing 204 and towards an engine 110 through an outlet pipe 218.

Figure 13:
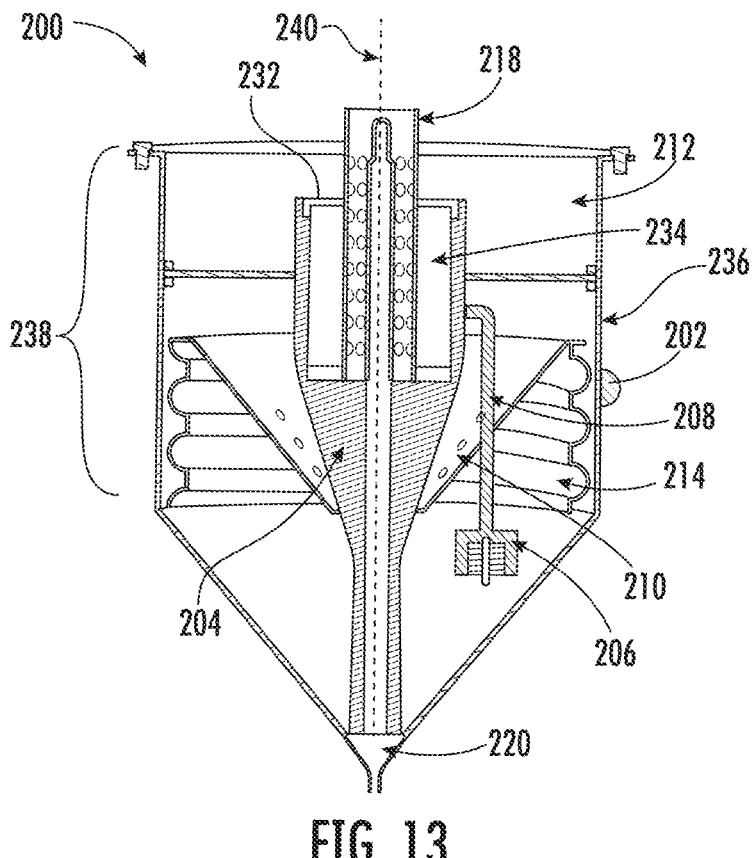
FIG. 13 is a sectional view of the multiple stage separation vortex flow air filter according to one example.

FIG. 13 is another view of FIG. 3, according to another example. The multiple stage separation vortex flow air filter 200 has an air filter housing 236 having a central axis 240. A cylindrical body 214 is located within the air filter housing 236 proximate to a bottom of an upper shell 238 of the air filter housing 236. An air inlet 202 is eccentrically connected to the air filter housing 236 to cause air flowing through the air inlet 202 to create a vortex around the cylindrical body 214 during operation. An perforated conical element 210 in which the air flows through during operation is located within the cylindrical body 214 around the central axis 240. An oblong conical casing 204 that forms a conical passage and located along the central axis 240 and partially within the perforated conical element 210, wherein air enters the conical passage through a whirling ring 232 during operation. An air filter element is located within the oblong conical casing 204, wherein filtered air flows through the air filter element during operation and enters into an engine 110 through an outlet pipe 218.

Figure 14:
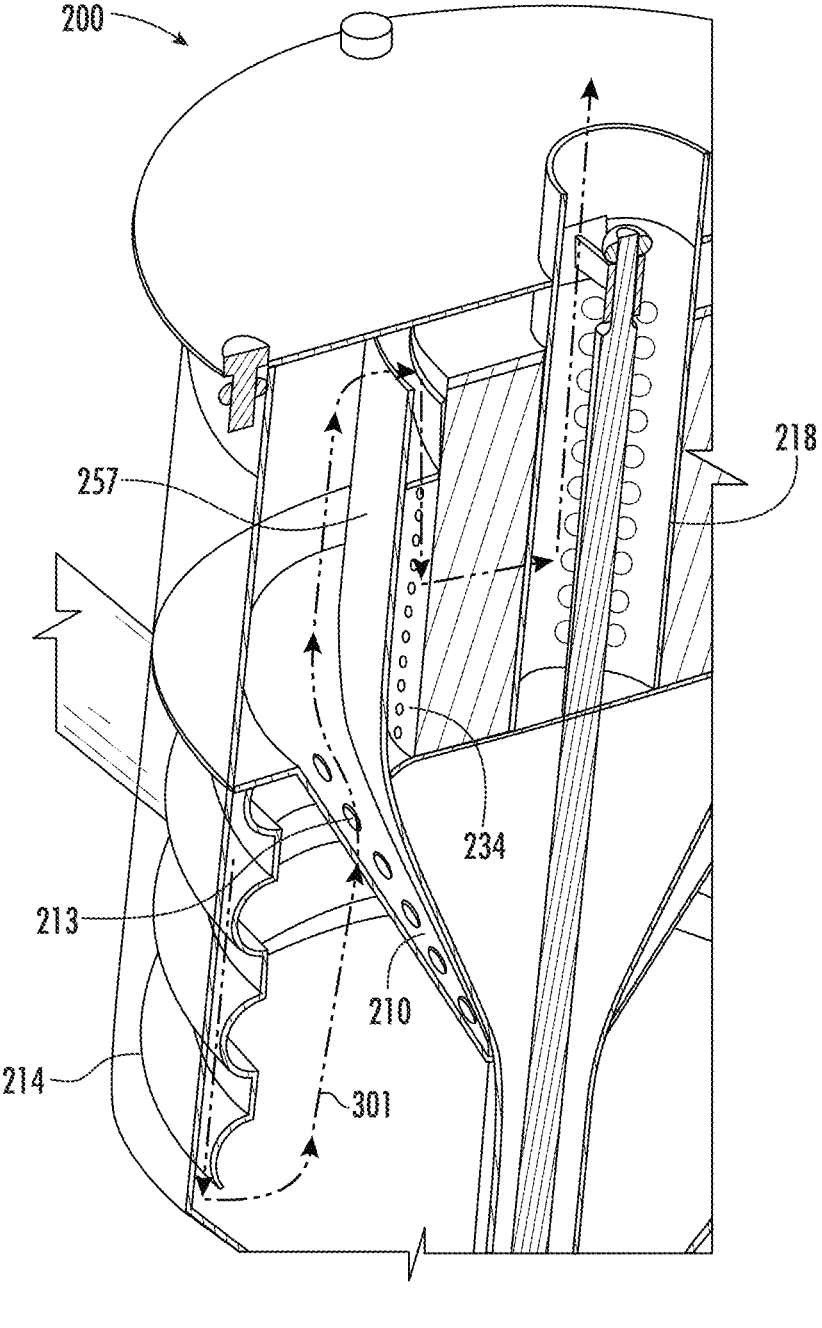
FIG. 14 is a sectional view of the vortex flow air filter according to one example.

FIG. 14 depicts a sectional view of the vortex flow air filter 200. In particular, FIG. 14 illustrates the path of air flow 301 as it enters the vortex flow air filter 200 and traverses down along the external surface of the cylindrical body 214. The air flow 310 then proceeds underneath the external surface of the cylindrical body 214 into the interior of the upper shell of vortex flow air filter 200. Air flow 301 subsequently enters one or more of perforations 213 of cylindrical body 214 to flow up the external side of upper cylindrical portion 257. Once air flow 301 reaches the top of upper cylindrical portion 257, air flow 301 traverses down along the external sides of the perforated filter housing 234 and into its perforations. Air flow 301 then moves through an air filter element into the perforated outlet pipe 218 and ascends up the tube until it exits vortex flow air filter 200.

Examples

Example 1: A multiple stage separation vortex flow air filter (200) comprising:
    an air filter housing (236) having a central axis (240);

a cylindrical body (214) located within the air filter housing (236) proximate a bottom of an upper shell (238) of the air filter housing (236);

an air inlet (202) eccentrically connected to the air filter housing (236) to cause air flowing through the air inlet (202) to create a vortex around the cylindrical body (214) during operation;

a perforated conical element (210) in which the air flows through during operation; the perforated conical element (210) within the cylindrical body (214) around the central axis (240);

an oblong conical casing (204) that forms a conical passage and located along the central axis (240) and partially within the perforated conical element (210), wherein air enters the conical passage through a whirling ring (232) during operation; and an air filter element (222) within the oblong conical casing (204), wherein air flows through the air filter element during operation and enters into an engine (110) through an outlet pipe (218).

Example 2: The multiple stage separation vortex flow air filter (200) of example 1, wherein the oblong conical casing (204) is mounted to the outer shell 212 via a bracket (216).

Example 3: The multiple stage separation vortex flow air filter (200) of any of examples 1-2, wherein the oblong conical casing (204) is connected to a perforated disk (224) that is connected to a central rod (226) located along a central axis (240) of the multiple stage separation vortex flow air filter (200);

Example 4: The multiple stage separation vortex flow air filter (200) of any of examples 1-3, wherein centrifugal force due to the vortex created results in a majority of moisture and dust particles in the air to separate from the air and be deposited in a mouth component (220) located at a bottom of the air filter housing (236).

Example 5: The multiple stage separation vortex flow air filter (200) of any of examples 1-4, wherein the whirling ring (232) creates a vortex as the air flows through the whirling ring (232), the vortex causing moisture and dust particles in the air to separate from the air and be deposited in a mouth component (220) located at a bottom of the air filter housing (236).

Example 6: The multiple stage separation vortex flow air filter (200) of any of examples 1-5, wherein the cylindrical body (214) comprises a corrugated cylindrical helical plate.

Example 7: The multiple stage separation vortex flow air filter (200) of any of examples 1-6, further comprising a perforated filter housing (234) that contains the air filter element (222).

Example 8: The multiple stage separation vortex flow air filter (200) of any of examples 1-7, further comprising a pressure safety valve assembly (206) connected to the oblong conical casing (204) via a bypass pipe line (208).

Example 9: The multiple stage separation vortex flow air filter (200) of example 8 wherein the pressure safety valve assembly comprises:

a valve assembly shell (1102) having an air outlet (1116) at a first end (1118) of the valve assembly shell (1102);

a perforated shell (1104) mounted within the hollow shell and having perforated sides and a perforated bottom end (1120) at a second end (1122) of the valve assembly shell (1102) and a mounting hole at a top (1124) of the perforated shell (1104), the mounting hole for receiving a threaded bolt (1112) having a plate (1110) that sits on the top (1124) that is held in place by a threaded nut (1114); and a spring (1106) within the perforated shell (1104) and sitting on a moveable plate (1108) within the perforated shell (1104), wherein the moveable plate (1108) during operation is pushed up by air present in the bottom side of perforated shell (1104) through perforations present on the perforated bottom end (1120) of the perforated shell (1104) when there is an abnormal pressure drop due to blockage in the cylindrical body (214) or in the perforated conical element (210) or in the whirling ring (232) or in combination thereof.

Example 10: A method to filter air in a multiple stage separation vortex flow air filter (200), the method comprising:

directing (1201) air flow having moisture and dust particles through an air inlet (202) eccentrically connected to an air filter housing (236) of the multiple stage separation vortex flow air filter (200) to cause the air flowing through the air inlet (202) to create a vortex around a cylindrical body (214) located within the air filter housing (236) proximate a bottom of an upper shell (238) of the air filter housing (236), wherein centrifugal force due to the vortex created results in a majority of moisture and dust particles in the air to separate from the air and be deposited in a mouth component (220) located at a bottom of the air filter housing (236);

directing (1203) the air flow through an perforated conical element (210) located within the cylindrical body (214) and around a central axis (240) of the filter housing (236);

directing (1205) the air flow through a conical passage formed in an oblong conical casing (204) located along the central axis (240) and partially within the perforated conical element (210); and directing (1207) the air flow through an air filter element (222) within the oblong conical casing (204) and towards an engine (110) through an outlet pipe (218).

Example 11: The method of example 10, wherein air enters the conical passage through a whirling ring (232)

Example 12: The method of example 11, wherein the whirling ring (232) causes the air to form a vortex, wherein centrifugal force due to the vortex forces dust and moisture particles in the air to separate from the air and be deposited in the mouth component (220).

Example 13: A vehicle (100) comprising:

an engine (110); and a multiple stage separation vortex flow air filter (200) comprising:

an air filter housing (236) having a central axis (240);

a cylindrical body (214) located within the air filter housing (236) proximate a bottom of an upper shell (238) of the air filter housing (236);

an air inlet (202) eccentrically connected to the air filter housing (236) to cause air flowing through the air inlet (202) to create a vortex around the cylindrical body (214) during operation;

an perforated conical element (210) in which the air flows through during operation; the perforated conical element (210) within the cylindrical body (214) around the central axis (240);

an oblong conical casing (204) that forms a conical passage and located along the central axis (240) and partially within the perforated conical element (210), wherein air enters the conical passage through a whirling ring (232) during operation; and an air filter element (222) within the oblong conical casing (204), wherein air flows through the air filter element during operation and enters into an engine through an outlet pipe (218).

Example 14: The vehicle (100) of example 13, wherein the oblong conical casing (204) is mounted to the outer shell 212 via a bracket (216).

Example 15: The vehicle (100) of any of examples 13-14, wherein the oblong conical casing (204) is connected to a perforated disk (224) that is connected to a central rod (226) located along a central axis (240) of the multiple stage separation vortex flow air filter (200);

Example 16: The vehicle (100) of any of examples 13-15, wherein centrifugal force due to the vortex created results in a majority of moisture and dust particles in the air to separate from the air and be deposited in a mouth component (220) located at a bottom of the air filter housing (236).

Example 17: The vehicle (100) of examples 13-16, wherein the whirling ring (232) creates a vortex as the air flows through the whirling ring (232), the vortex causing moisture and dust particles in the air to separate from the air and be deposited in a mouth component 220 located at a bottom of the air filter housing (236).

Example 18: The vehicle (100) of any of examples 13-17, wherein the cylindrical body (214) comprises a corrugated cylindrical helical plate.

Example 19: The vehicle (100) of any of examples 13-18, further comprising a perforated filter housing (234) that contains the air filter element (222).

Example 20: The vehicle (100) of any of examples 13-19, further comprising a pressure safety valve assembly connected to the oblong conical casing (204) via a bypass pipe line (208).

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A multiple stage separation vortex flow air filter comprising:
   an air filter housing having a central axis and an upper shell;
   a cylindrical body located within the air filter housing proximate a bottom of the upper shell of the air filter housing;
   an air inlet eccentrically connected to the air filter housing to cause air flowing through the air inlet to create a vortex around the cylindrical body during operation;
   a perforated conical element in which the air flows through during operation, the perforated conical element within the cylindrical body around the central axis;
   an oblong conical casing that forms a conical passage and located along the central axis and partially within the perforated conical element, wherein air enters the conical passage through a whirling ring during operation; and
   an air filter element within the oblong conical casing, wherein air flows through the air filter element during operation and enters into an engine through an outlet pipe.

2. The multiple stage separation vortex flow air filter of claim 1, wherein the oblong conical casing is mounted to a housing of an outer shell via a bracket.

3. The multiple stage separation vortex flow air filter of claim 1, wherein the oblong conical casing is connected to a perforated disk that is connected to a central rod located along a central axis of the multiple stage separation vortex flow air filter.

4. The multiple stage separation vortex flow air filter of claim 1, wherein centrifugal force due to vortex created results in a majority of moisture and dust particles in the air to separate from the air and be deposited in a mouth component located at a bottom of the air filter housing.

5. The multiple stage separation vortex flow air filter of claim 1, wherein the whirling ring creates a vortex as the air flows through the whirling ring, the vortex causing moisture and dust particles in the air to separate from the air and be deposited in a mouth component located at a bottom of the air filter housing.

6. The multiple stage separation vortex flow air filter of claim 1, wherein the cylindrical body includes a helical channel traversing around its inner surface.

7. The multiple stage separation vortex flow air filter of claim 1, further comprising a perforated filter housing that contains the air filter element.

8. The multiple stage separation vortex flow air filter of claim 1, further comprising a pressure safety valve assembly connected to the oblong conical casing via a bypass pipe line.

9. The multiple stage separation vortex flow air filter of claim 8 wherein the pressure safety valve assembly comprises:

a valve assembly shell having an air outlet at a first end of the valve assembly shell;

a perforated shell mounted within a hollow shell and having perforated sides and a perforated bottom end at a second end of the valve assembly shell and a mounting hole at a top of the perforated shell, the mounting hole for receiving a threaded bolt having a plate that sits on the top that is held in place by a threaded nut; and a spring within the perforated shell and sitting on a moveable plate within the perforated shell, wherein the moveable plate during operation is pushed up by air present in a bottom side of the perforated shell through perforations present on the perforated bottom end of the perforated shell when there is an abnormal pressure drop due to blockage in the cylindrical body or in a perforated conical element or in the whirling ring or in combination thereof.

10. A method to filter air in a multiple stage separation vortex flow air filter, the method comprising:

directing air flow having moisture and dust particles through an air inlet eccentrically connected to an air filter housing of the multiple stage separation vortex flow air filter to cause the air flowing through the air inlet to create a vortex around a cylindrical body located within the air filter housing proximate a bottom of an upper shell of the air filter housing, wherein centrifugal force due to the vortex created results in a majority of moisture and dust particles in the air to separate from the air and be deposited in a mouth component located at a bottom of the air filter housing;

directing the air flow through an perforated conical element located within the cylindrical body and around a central axis of the filter housing;

directing the air flow through a conical passage formed in an oblong conical casing located along the central axis and partially within the perforated conical element; and directing the air flow through an air filter element within the oblong conical casing and towards an engine through an outlet pipe.

11. The method of claim 10, wherein air enters the conical passage through a whirling ring.

12. The method of claim 11, wherein the whirling ring causes the air to form a vortex, wherein centrifugal force due to the vortex forces dust and moisture particles in the air to separate from the air and be deposited in the mouth component.

13. A vehicle comprising:

an engine; and a multiple stage separation vortex flow air filter comprising:

an air filter housing having a central axis;

a cylindrical body located within the air filter housing proximate a bottom of an upper shell of the air filter housing;

an air inlet eccentrically connected to the air filter housing to cause air flowing through the air inlet to create a vortex around the cylindrical body during operation;

an perforated conical element in which the air flows through during operation, the perforated conical element within the cylindrical body around the central axis;

an oblong conical casing that forms a conical passage and located along the central axis and partially within the perforated conical element, wherein air enters the conical passage through a whirling ring during operation; and an air filter element within the oblong conical casing, wherein air flows through the air filter element during operation and enters into the engine through an outlet pipe.

14. The vehicle of claim 13, wherein the oblong conical casing is mounted to an outer shell via a bracket.

15. The vehicle of claim 13, wherein the oblong conical casing is connected to a perforated disk that is connected to a central rod located along a central axis of the multiple stage separation vortex flow air filter.

16. The vehicle of claim 13, wherein centrifugal force due to the vortex created results in a majority of moisture and dust particles in the air to separate from the air and be deposited in a mouth component located at a bottom of the air filter housing.

17. The vehicle of claim 13, wherein the whirling ring creates a vortex as the air flows through the whirling ring, the vortex causing moisture and dust particles in the air to separate from the air and be deposited in a mouth component located at a bottom of the air filter housing.

18. The vehicle of claim 13, wherein the cylindrical body comprises a corrugated cylindrical helical plate.

19. The vehicle of claim 13, further comprising a perforated filter housing that contains the air filter element.

20. The vehicle of claim 13, further comprising a pressure safety valve assembly connected to the oblong conical casing via a bypass pipe line.

\* \* \* \* \*